Oct. 22, 1940.  L. N. SORENSEN  2,218,962
CONTINUOUS MIXER
Filed March 16, 1939  3 Sheets-Sheet 1

Inventor
Louis N. Sorensen

By John A. Bernhardt
Attorney

Oct. 22, 1940.  L. N. SORENSEN  2,218,962
CONTINUOUS MIXER
Filed March 16, 1939  3 Sheets-Sheet 2
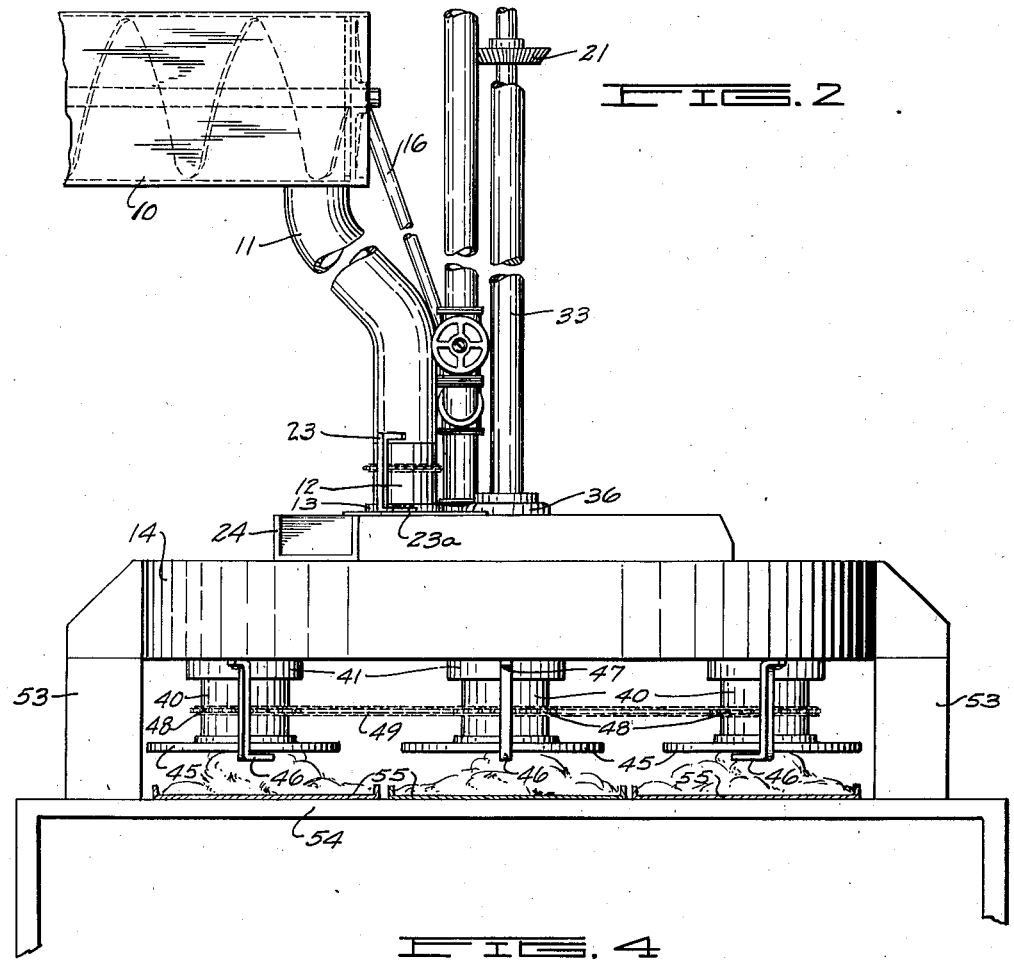
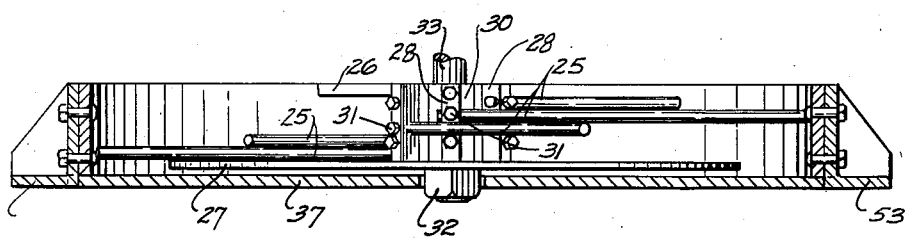
Inventor
Louis N. Sorensen
By John A. Bommhardt
Attorney

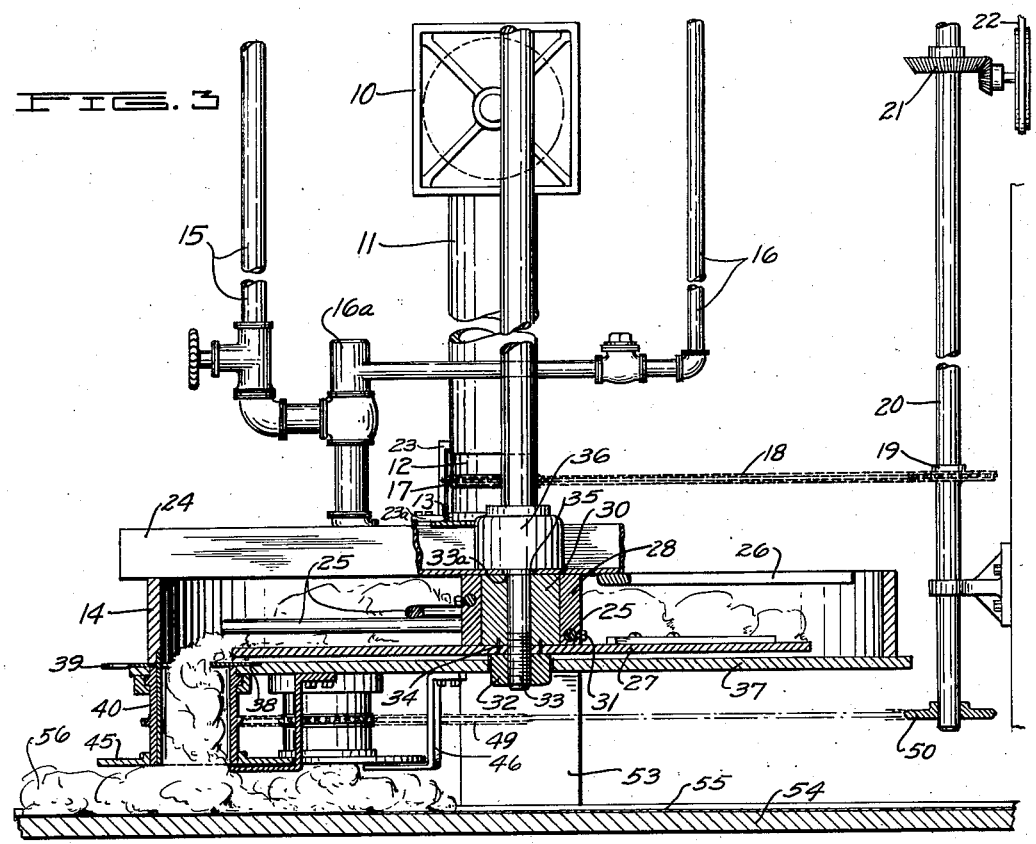
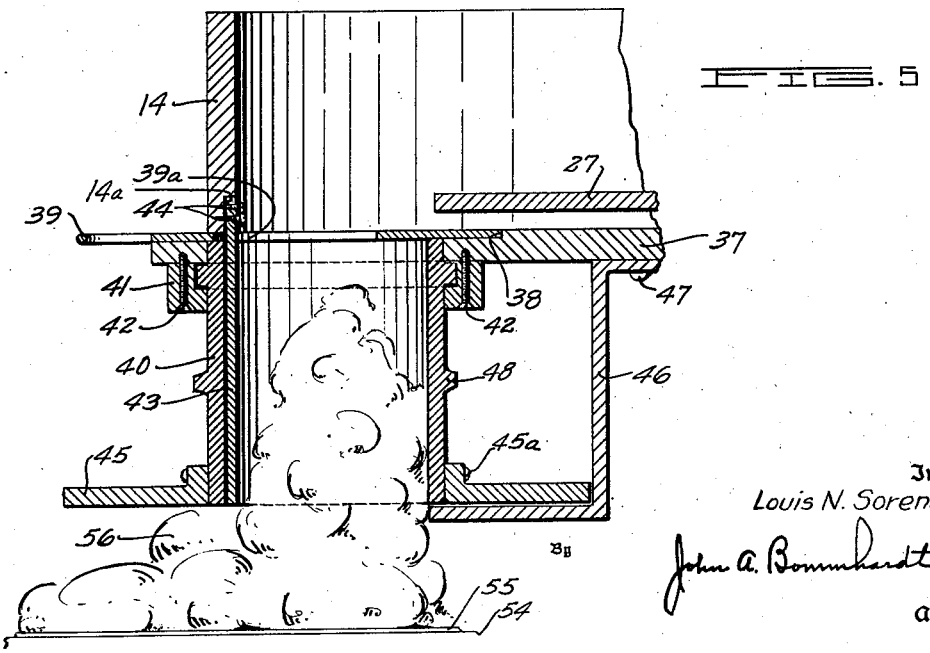

Patented Oct. 22, 1940

2,218,962

UNITED STATES PATENT OFFICE 2,218,962

CONTINUOUS MIXER

Louis N. Sorensen, Port Clinton, Ohio, assignor, by mesne assignments, to The Celotex Corporation, Chicago, Ill., a corporation of Delaware Application March 16, 1939, Serial No. 262,131

11 Claims. (Cl. 259—7)

My invention relates to the mixing of finely ground material, such as calcined gypsum, cement or the like with water and chemicals in a continuous operation.

One object is to provide a means whereby a dry powdered material is fed through a screw conveyor preferably, although other feeding means may be used, into a pipe from which it is fed through a rotating feeder spout into the mixer where it is joined with a previously mixed solution of water and chemicals in a continuous mixing process.

Another object is to provide an apparatus with a more simple and direct method for mixing the calcined gypsum or the like with the proper amount of water and chemicals to secure a more uniform product and eliminating the usual lumps and lack of uniformity in setting, which has heretofore been a principal defect with prior machines.

These and other objects will be noted from the following specification and its accompanying illustrations in which:

Fig. 1 is a top plan view of the machine.

Fig. 2 is a side elevation of Fig. 1.

Fig. 3 is a section partly in elevation taken on line 3—3 of Fig. 1.

Fig. 4 is an elevation of the rotor with the shell in section, showing the manner of mounting the sweeps.

Fig. 5 is an enlarged section of one of the rotary spouts discharging the mixture onto the bottom paper.

Fig. 6 is an enlarged section of the gypsum discharge feeder spout.

Again referring to the illustrations:—a screw conveyor 10 carries the dry material to a discharge pipe 11 secured to the conveyor through which it passes downward into a rotating feeding spout 12 mounted rotatably within a bearing 13 secured to the said discharge pipe 11.

From the rotating feeding spout 12, the dry material is fed directly into the circular mixer shell or pan 14 rearward of the water and chemical which is fed through the water line 15 and the chemical line 16 into a mixing pipe 16a from which it is discharged into the mixer shell 14.

The feeder spout 12 is rotated by means of a sprocket 17 on the periphery of the spout 12 and a chain 18 driven by a sprocket 19 on the drive shaft 20 which in turn is motivated through the usual gears 21 by a pulley 22 attached to a motor (not shown).

A scraper 23 mounted on a bracket 23a on the top of the cross channel beam 24 extends downward from the slot 11a in the discharge pipe 11, and within the rotating feeder spout 12 adjacent the inner wall thereof to keep the feeder spout clear of the wet mixture if and as it splashes upward.

A plurality of mixing sweeps or arms 25 and 26 are mounted above a disk or rotor 27 within mounting blocks 28 secured to the flat faces of the hexagon post 30, the sweeps being secured therein by set screws 31, and the rotor 27 is held against the bottom of the hexagon post 30 by means of a nut 32 screwed over the end of the shaft 33. Pins 34 through the hexagon post and rotor prevent the turning of the rotor except as it rotates with the assembly of sweeps and hexagon post. The mixing sweeps may be supported adjacent the periphery of the rotor and secured thereto by supporting posts although these are not necessary.

The sweeps 25 are preferably round rods while the single sweep 26 is a square scraper sweep, and the round mixing sweeps 25 are radiated from the hexagon post 30 each adjacent sweep above the previous sweep, with the square scraper sweep 26 at the top, and this sweep keeps the top of the mixer shell 14 clean as it rotates around the inner periphery of the shell adjacent the top edge.

The channel 24 is mounted across the top of the shell 14 and has an aperture 35 therethrough, and the rotating shaft 33 is shouldered at 33a, the enlarged shouldered portion of the shaft extending upward through the aperture 35 in the channel 24 and the bearing 36, mounted within the said channel.

The smaller portion of the shaft 33 below the shoulder 33a extends downwardly through the hexagon post 30 and rotor 27. This shaft 33 preferably is rotated at approximately 300 to 500 R. P. M., by any suitable power geared or otherwise operatively connected to the shaft.

The bottom plate 37 of the mixer is secured to the mixer shell 14 by any suitable means such as welding, bolting or the like, and a plurality of recesses or seats 38 are cut in the top surface of the bottom plate 37 adjacent the periphery of said bottom plate and below the shell 14.

Gates 39 are drawn out and pushed in at will within these seats 38, and aperture 39a through the center of the gates registering with the opening in the rotating discharge spouts 40, said spouts being mounted below the bottom plate 37 within bearings 41 secured to the bottom plate by bolts 42.

Scraper bars 43 are mounted within the rotating discharge spouts 40 and secured within a recess 14a in the shell 14 by bolts or screws 44.

Splash plates 45 are secured adjacent the bottom of the rotating discharge spouts 40 by bolts or screws 45a and revolve with the spout.

Splash plate scraper angles 46 are mounted on the bottom surface of the plate 37 by bolts 47, the flanged end of said scraper angles extending beneath the splash plates 45 to the edge of the inner wall of the discharge spouts 40.

Sprockets 48 around the periphery of the rotating discharge spouts 40 motivate the said spouts through a chain 49 over a sprocket 50 on the shaft 20, and this shaft revolves at approximately 30 to 60 R. P. M.

Scrapers 51 are secured to the disk rotor 27 by bolts 52 and are set on an angle to facilitate the sweeping action and scrape the bottom of the mixer pan. These scrapers travel over the peripheral part of the bottom of the pan and serve to carry the mix around to the outlets.

The mixer pan is supported on blocks or posts 53 at a suitable height above the table 54.

In operation, the water and chemicals discharge into the mixing pipe 16a from their respective lines 15 and 16 and from the mixing pipe 16a into the mixer pan. The calcined gypsum feeds from the screw conveyor 10 through the discharge pipe 11 and the rotating feeding spout 12 into the mixer following the water and chemical. The rotor disk 27 and sweeps 25 and 26 rotate at a comparatively high speed, whipping and mixing the wet and dry ingredients together as they revolve, and the gates 39 are pushed inwardly in the slots 38 and the wet mixture 56 is fed into the rotating discharge spouts 40 through the apertures 39a in the gates 39 and emerges in a plurality of streams on to an equal number of bottom paper strips 55 passing over the table 54. The strips may be fed over the table by any suitable means, in a manner known in the art.

The scrapers in the rotating spouts and beneath them, as well as those within the shell 14, keep the lumps from forming and produces a uniform product.

The paper 55 may be in 1, 2 or 3 streams, depending upon what width product is being made as the machine is designed to take care of from one to three streams simultaneously. This paper is actually the face paper and is carried forward from the bottom rolls over a guide which is forward of the mixing machine and thence over the table 54 whereupon the wet mix or slurry discharges upon it and is carried forward beneath a master roller.

Paper from the top rolls is carried over the mixer and driving mechanism and across a guide coming down vertically to the master roll.

The bottom sheets 55 have their edges folded so that the slurry does not leak out, this also makes a closed edge board. The top sheets go under the master roll on top of the slurry and forms the top of the board. The distance between the master roll and the table determine the thickness of the board and may be adjusted at will.

The board is then picked up by a carrier belt, the friction between the belt and board causing the board to move forward over a second belt to the knives where it is cut and carried forward over rollers to the transfer table. The weight of the boards on the carrier belts draw the strips or strings along.

When three strings of lath are made, three top and three bottom paper rolls are hung. The sheet from each bottom roll then passes under one of the rotating spouts of the mixture and carries one third of the wet mixture or slurry forward under the master roll where the top sheet is applied. The three strings of lath travel side by side on the carrier belt until they reach brass driven rolls which in turn carries them through the knife and delivers them to the transfer.

Important features of novelty in the machine are:

1. The radial whipping sweeps of which there are six, these are so positioned in the mixing chamber that when set in motion will whip and lash the material to a perfect smoothness.

2. The splash plates 45 and scrapers 43 are important because if these were not used the set stucco would build up and the machine would have to be stopped and the set stucco removed, otherwise it would tear the paper.

3. The rotating spouts through which the mixture is discharged and which prevent the material from clogging the discharge spouts.

4. The feature of providing the mixer with three discharge rotating spouts.

I claim:

1. The combination with a mixing pan having a plurality of outlets in the bottom thereof, of a rotary spout carried in bearings at each outlet, a power shaft standing beside the pan and chain and sprocket gearing between the shaft and said spouts, to rotate the latter.

2. In a mixer, a mixing pan, a rotating shaft associated therewith, said shaft having mounted thereon mixing sweeps comprising rods projecting outwardly therefrom and successively therearound and displaced successively one with respect to another in the axial direction of the shaft, the displacement thereof in the axial direction of the shaft such that the sum of the vertical dimensions of the individual sweeps is substantially equal to the overall vertical dimension of the sweeps as mounted on the shaft.

3. In an article of manufacture comprising a machine for producing a stucco slurry, an horizontal circular substantially flat bottomed mixing pan, a vertical rotary shaft substantially centrally thereof, a rotary disc mounted on the shaft for rotation thereby adjacent the bottom of the pan and spaced at its edge from the side wall of the pan to freely discharge the slurry from the disc into the peripheral portion of the pan by centrifugal force, outwardly projecting and substantially radially diverging, elongated sweeps carried by the shaft above the disc, the vertical projections of the sweeps in a vertical plane in substantial edge to edge contact, a discharge port adjacent the periphery of the pan, and a feed port, the feed port spaced from the discharge port and positioned inwardly therefrom with respect to the side wall of the pan.

4. In an article of manufacture comprising a machine for producing a stucco slurry, an horizontal circular mixing pan, a vertical rotary shaft substantially centrally thereof, a rotary disc mounted on the shaft for rotation thereby adjacent the bottom of the pan and spaced at its edge from the side wall of the pan to freely discharge the slurry from the disc into the peripheral portion of the pan by centrifugal force, outwardly projecting and substantially radially diverging, elongated sweeps carried by the shaft above the disc, the sweeps comprising rod-like member successively arcuately displaced each with respect to the preceding and successively displaced along the axis of the shaft whereby the paths of the sweeps as they are rotated have the general effect of an ascending helix, the projections of said sweeps on a vertical plane being in substantial edge to edge contact, a discharge port adjacent the periphery of the pan, and a feed port, the feed port spaced from the discharge port and positioned inwardly therefrom with respect to the side wall of the pan.

5. A substantially circular and horizontally positioned mixing pan, discharge outlets arcuately spaced, one from another, adjacent the periphery of the mixing pan, below each said discharge outlet a dependent rotary cylinder through which the discharge outlet is adapted to discharge, bearings rotatably supporting a rotary discharge cylinder in dependent relation with respect to each of such discharge outlets, and a stationary scraper member for each rotary discharge cylinder, each of such stationary scraper members mounted exteriorly of its respective discharge cylinder and having a portion thereof extending into and positioned adjacent the interior periphery of its respective rotary discharge cylinder.

6. In a mixer adapted for the production of a hardening slurry, a mixing pan, the mixing pan having peripherally thereof a discharge spout leading therefrom and comprising a rotary cylinder, bearings rotatably supporting the cylinder and means for rotating the cylinder, each such rotary cylinder carrying at its outer end a flange-like outwardly projecting splash plate rotatable therewith.

7. In combination in a mixer adapted for the mixing and discharge therefrom of a hardening slurry, a mixing pan, a discharge spout therefor, a flange-like splash plate carried by the terminal portion of the discharge spout, and stationary scraper members, one of the scraper members positioned closely adjacent the interior peripheral surface of the discharge spout, the other scraper member mounted closely adjacent the lower face of the splash plate, and means mounting the discharge spout and splash plate with respect to the scrapers whereby the scraper members respectively may scrape from the interior of the discharge spout and from the lower face of the splash plate slurry tending to adhere thereto.

8. In combination in a mixer adapted for receiving, mixing, and discharging therefrom ingredients comprising when mixed a hardening slurry, a mixing pan, a rotating mixing member therein, feed and discharge spouts, each such feed and discharge spout adjacent the mixing pan comprising rotatable cylindrically formed members, means rotatably mounting each of said cylindrically formed members, stationary scraper means mounted exteriorly of but extending into the interior of each of said cylindrically formed members and positioned adjacent the respective interior peripheral surfaces thereof, and means for rotating each of said cylindrically formed members whereby hardening material tending to collect on the interior surfaces thereof will be detached by the scraping action of the respective scraper means.

9. In a mixer adapted for the production of a hardening slurry, a mixing pan, the mixing pan having adjacent the periphery thereof a discharge port, a discharge spout leading from said discharge port and comprising a cylinder rotatable relative to the mixing pan, bearings rotatably supporting the cylinder in receiving relation adjacent the discharge port and means for rotating the cylinder.

10. In the combination of a mixing pan with a feeding supply spout therefor mounted thereover for discharge thereinto, the feeder spout comprising a stationary portion and a rotary cylindrical portion, the rotary cylindrical portion interposed therein immediately adjacent the discharge thereof into the mixing pan, bearings rotatably supporting the rotary portion of the feed spout, a stationary scraper member mounted exteriorly of the rotary feed spout and extending thereinto closely adjacent the interior peripheral surface thereof and means to rotate the rotatably mounted portion of the feed spout.

11. In combination in a mixer adapted for mixing therein and discharging therefrom a hardening slurry, a mixing pan, a discharge port in a wall of the mixing pan, a discharge spout mounted in discharging relation with respect to the discharge port and receiving discharged slurry therefrom, and a discharge spout scraper; the scraper mounted outside the discharge spout, extending through the length of the discharge spout in scraping relation to the interior peripheral wall thereof and in substantially co-planar relation to a portion of the periphery of the discharge port, the discharge spout and scraper relatively revoluble one with respect to the other.

LOUIS N. SORENSEN.